United States Patent Office 3,477,956
Patented Nov. 11, 1969

3,477,956
HYDROXYAMINE PHOSPHATE ESTER SCALE INHIBITORS
James R. Stanford and Paul G. Vogelsang, Jr., Houston, Tex., assignors to Nalco Chemical Company, Chicago, Ill., a corporation of Delaware
No Drawing. Filed Dec. 9, 1966, Ser. No. 600,354
Int. Cl. C09k 3/00; C02b 5/06
U.S. Cl. 252—855                    13 Claims

ABSTRACT OF THE DISCLOSURE

Phosphated hydroxy amines obtained by reacting polyphosphoric acid or phosphorus pentoxide with hydroxyamines, e.g., diethanolamine or triethanolamine, with or without neutralization, are used as scale inhibitors in brines, especially in oil wells, where calcium and barium salts are present.

---

The invention is concerned with the prevention of hardness scale deposits on metal surfaces in contact with hard water containing hardness scale-forming ions and with the preparation of compounds or compositions which are effective for this purpose. In particular, the invention is concerned with scale prevention in natural brines on ferrous metal walls and other surfaces in oil producing and waterflood systems.

Inorganic polyphosphates have long been the most effective and economical sequestering agents used for the prevention of alkaline deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of inorganic polyphosphates is needed.

One of the objects of the present invention is to provide new and improved compounds and compositions which will supply this need. Other objects will appear hereinafter.

In accordance with the invention it has been found that phosphated hydroxy amines, with or without neutralization, are effective scale inhibitors in inhibiting scale deposits on metal surfaces in contact with hard water containing hardness scale-forming ions and especially in inhibiting scale produced by natural brines, such as those found in underground formations, as, for example, in oil wells.

In the practice of the invention the phosphated hydroxy amine or a neutralization product thereof is introduced into hard water or brine which is contacted with metal surfaces while maintaining a hardness-ion-precipitation-preventing quantity in the order of 0.5 to 100 parts per million (p.p.m.) of the active effective compound.

The products provided for the purpose of the invention can be described as polyphosphoric acid esters of hydroxy amines. They are preferably prepared by reacting the hydroxy amine with polyphosphoric acid and/or phosphorus pentoxide at elevated temperature, preferably in the order of about 50° C. to 175° C., although somewhat higher temperatures on the order of 200° C. to 250° C. can sometimes be used, depending upon the nature of the hydroxy amine reactant. In the early stages, the reaction is exothermic and care must be taken to control th temperature. The reaction time is preferably at least about 30 minutes. The reaction may be conducted for a longer period, however, e.g., up to three to five hours, to assure complete reaction. If desired, a catalyst, such as boron trifluoride etherate complex, may be used. When using polyphosphoric acid, the hydroxy amine can be added to the polyphosphoric acid liquid. Conversely, the phosphoric acid can be added to the hydroxy amine.

The resultant reaction product may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethyl amine, ethylene diamine, diethylene triamine, pyridine, morpholine or other amine. The amine should preferably be a water soluble amine or at least one that does not destroy solubility in water.

The hydroxy amines can be relatively simple amines, such as, diethanolamine or triethanolamine, or they can be more complex, such as, the still residues obtained in the manufacture of triethanolamine or the products obtained by oxyalkylating amines. They can be monoamines or polyamines. They can have a single hydroxy group as in aminoethylethanolamine but preferably have a plurality of hydroxy groups. The oxyalkylated amines are obtained by reacting an alkylene oxide, for example, ethylene oxide or 1,2-propylene oxide, with an amine containing one or more reactive hydrogen atoms. The preferred amines contain at least one 2-hydroxy ethyl group ($-CH_2CH_2OH$) provided by oxyethylation. The primary hydroxyl groups thereof are more effective than the secondary hydroxyl groups which would be provided by oxypropylation

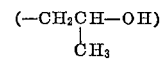

However, oxypropylation may be used if the oxypropylated product is then oxyethylated to provide a terminal 2-hydroxyethyl groups. Ethylenediamine, for example, can be oxyethylated with four moles of ethylene oxide per mole of diamine to produce a diamine containing four 2-hydroxyethyl groups. By using both ethylene oxide and 1,2-propylene oxide, products can be obtained with both hydroxyethyl and hydroxypropyl groups. The extent of the oxyalkylation can also be increased by increasing the number of moles of alkylene oxide and in some cases, it is desirable to use as many as thirty moles of alkylene oxide per mole of amine. In general, however, this is not necessary for the purpose of the invention. Other amines which can be oxyalkylated to provide hydroxy amines are diethylenetriamine, triethylenetetramine and tetraethylene pentamine. It is normally desirable that the hydroxy group which is to be phosphated should be separated from the nitrogen atom by at least one carbon atom and preferably by at least two carbon atoms as in the 2-hydroxyethyl group. Amines of this general structure are sometimes referred to as hydroxyalkyl amines or alkanolamines. It will be understood that mixtures of hydroxy amines as well as individual amines can be employed in preparing the phosphate esters. Hence, the products can consist of mixed phosphate esters and mixtures of phosphate esters of the hydroxy amines.

The resultant phosphate esters have an average of at least one and up to all of the hydroxyls of the amine replaced by phosphate ester groups derived from polyphosphoric acid or phosphorus pentoxide, said phosphate ester groups consisting essentially of one or both of a member selected from the group consisting of

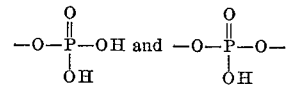

As previously indicated, the compounds provided by the invention include not only the free esters but also

Example I 100 parts of a fully oxyethylated ethylenediamine made by reacting 4 moles of ethylene oxide with 1 mole of ethylenediamine was added to the reaction vessel and 25 parts of polyphosphoric acid was added gradually with agitation while allowing the temperature of the reaction mixture to increase to 100° C. The temperature was held at 100° C. for 30 minutes. The reaction product was then cooled and 20 parts of N-propanol and 150 parts of water were added.

Example II 50 parts of polyphosphoric acid was added to 100 parts of a triethanolamine residue (Amine N-1) and the mixture was agitated with temperature control while allowing the temperature to increase to 100° C. The reaction mixture was then cooled and 150 parts of water added.

Example III 400 parts of polyphosphoric acid was added to 250 parts of triethanolamine residue (Amine N-1) with agitation while allowing the temperature to increase to 105° C. The mixture was then heated to 130° C. and held at that temperature for one hour. It was then cooled and 250 parts of water added.

Example IV 100 parts of polyphosphoric acid was added to 200 parts of aminoethylethanolamine which had previously been heated to 70° C. During the addition, the reaction mixture was agitated and the temperature was allowed to increase to 120° C. It was held at 120° C. for 30 minutes, then cooled and 600 parts of water added.

Example V 200 parts of the product obtained in Example III was mixed with 100 parts of 50% liquid caustic soda.

Example VI 400 parts of polyphosphoric acid was added to 250 parts of triethanolamine residue (Alkanolamine SB) in a reaction vessel with agitation and the temperature was allowed to increase to 200° C. The reaction mixture was then cooled and 250 parts of water added.

Example VII 125 parts of triethanolamine residue (Amine N-1) was mixed with 125 parts of a blend of 60% N,N'-diethanolethylenediamine and 40% N,N' - tetraethanolethylenediamine and the mixture heated to 50° C. The mixture of amines was then added to 400 parts of polyphopsphoric acid with agitation while allowing the temperature to increase to 150° C. The mixture was held at 150° C. for 30 minutes, then cooled below 100° C. and then 250 parts of water added.

Example VIII 300 parts of the product obtained in Example VII was mixed at ambient temperature with 100 parts of 50% liquid caustic soda.

Example IX 400 parts of polyphosphoric acid was added to 300 parts of triethanolamine residue (Amine N-1) in a reaction vessel with agitation while allowing the temperature to rise to 140° C. The mixture was cooled below 100° C. and 300 parts of water added.

Example X

A mixture of 125 parts of triethanolamine residue (Alkanolamine SB) and 125 parts of triethanolamine residue (Amine N-1) was heated to 50° C. and 400 parts of polyphosphoric acid was slowly added with agitation while allowing the temperature to increase to 145° C. The resultant product was cooled to 100° C. and 250 parts of water added.

Example XI

An oxyethylated polyamine was prepared by reacting 37 parts of ethylene oxide with 63 parts of commercial polyamine (Polyamine H Solids) and 300 parts of this product was neutralized with 125 parts of 99% acetic acid. The product was cooled to 80° C. and 100 parts of N-propyl alcohol was added. 100 parts of polyphosphoric acid was then added while allowing the temperature to increase to 130° C. The temperature was held at 130° C. for 30 minutes. Thereafter, the product was cooled to 90° C. and 300 parts of water added.

Example XII 100 parts of the oxyethylated polyamine described in Example XI was neutralized with 50 parts of 99% acetic acid while keeping the temperature below about 90° C. To this product was then added 350 parts of triethanolamine residue (Amine N-1). 700 parts of polyphosphoric acid was added to this mixture with agitation while allowing the temperature to increase to 130° C. The reaction mixture was held at this temperature for one hour, then cooled to 95° C. and 300 parts of water added.

Example XIII 100 parts of the product of Example XII was mixed with 50 parts of 50% liquid caustic soda.

Example XIV 400 parts of polyphosphoric acid was heated to 70° C. and 250 parts of triethanolamine residue (Amine N-1) was added with agitation while maintaining the temperature of the reaction mixture at 100–110° C. This temperature was maintained during ¾ of the hydroxy amine addition and during the last ¼ of said addition the temperature was increased to 130° C. It was held at 130° C. for 30 minutes. The product was cooled to 95° C. and 250 parts of water added.

Example XV 125 parts of triethanolamine residue (Alkanolamine SB) and 125 parts of triethanolamine residue (Amine N-1) were blended with agitation while heating to 50° C. and the blend was added to 400 parts of polyphosphoric acid with agitation at a rate which allowed the temperature of the reaction mixture to increase to 150° C.

The reaction mixture was held at 150° C. for 30 minutes, then cooled below 100° C. and 250 parts of water added.

Example XVI 300 parts of triethanolamine residue (Amine N-1) and 100 parts of fully oxyethylated ethylenediamine (see Example I) were blended with agitation and heated to 50° C. The mixture of hydroxy amines was then added to 750 parts of polyphosphoric acid at 70° C. with agitation while allowing the temperature of the reaction mixture to increase to 130° C. The temperature was held at 130° C. for 30 minutes. The product was cooled to below 100° C. and 700 parts of water added.

Example XVII 100 parts of the product of Example XVI was mixed with 50 parts of liquid caustic soda.

Example XVIII 300 parts of N,N'-tetraethanolethylenediamine heated to 50° C. was added to 430 parts of polyphosphoric acid heated to 70° C. with agitation and the temperature of the mixture was allowed to increase to 130° C. It was held at 130° C. for 30 minutes, cooled to below 100° C. and 500 parts of water added.

Example XIX

The process was the same as in Example XVIII except that 860 parts of polyphosphoric acid was employed and 800 parts of water was added.

Example XX 300 parts of diethanolamine was added to 480 parts of polyphosphoric acid previously heated to 70° C. with agitation and the temperature of the reaction mixture was allowed to increase to 130° C. It was held at 130° C. for 30 minutes, then cooled below 100° C. and 500 parts of water added.

Example XXI

The procedure was the same as in Example XX except that 960 parts of polyphosphoric acid was employed and 800 parts of water was added.

The phosphated hydroxy amines were evaluated as scale inhibitors in various amounts, heating the brine for a predetermined period and then determining the amount of calcium carbonate or calcium sulfate retained in solution.

A brine containing calcium carbonate was prepared by adding to distilled water 5180 milligrams per liter (mg./l.) $NaHCO_3$, 22,200 mg./l. NaCl, 6 mg./l. $Na_2SO_4$, 366 mg./l. $MgCl_2 \cdot 6H_2O$, and 2000 mg./l. $CaCl_2$. The water was sparged with carbon dioxide for 30 minutes before the salts were added and again for 30 minutes after the addition of the salts. This composition is hereinafter referred to as Brine A.

To prepare a brine for testing against calcium sulfate, two separate brines were prepared. The first, Brine B, was made by dissolving 7.5 grams of sodium chloride and 8.33 grams of calcium chloride in distilled water sufficient to make one liter. The second, Brine C, was made by dissolving 7.5 grams of sodium chloride, plus 10.66 grams $Na_2SO_4$ in distilled water sufficient to make one liter. These two brines were then mixed in equal parts and the tests were carried out with the addition of various proportions of the chemicals to be tested. These tests were made at various temperatures over predetermined periods of time. The amount of calcium sulfate in solution was determined at the end of each test. Some tests were made under static conditions and others with agitation.

The following examples illustrate the results obtained.

Example XXII

In this test, Brine A was used at a temperature of 130° F. for 20 hours in a static system, i.e., without agitation. The brine was seeded with 100 mg./l. of calcium carbonate.

A blank or control containing no added chemical had a calcium carbonate content of 1800 mg./l. at the beginning of the test and retained only 540 mg./l. All of the calcium carbonate was retained by the addition of 10 p.p.m. of the composition of Example III. Corresponding tests were made with other available commercial inhibitors and none of them caused the retention of all of the calcium carbonate at the same concentration.

Example XXIII

A test was carried out in the same manner as in Example XXII with Brine A except that the brine was not seeded with calcium carbonate. The control brine before heating contained 1840 mg./l. After heating for 20 hours at 130° F. it retained 680 mg./l. The addition of 5 p.p.m. and 10 p.p.m. of the composition of Example III in both cases caused all of the calcium carbonate to be retained in solution.

The addition of 5 p.p.m. of the composition of Example V caused 1720 mg./l. of the calcium carbonate to be retained in solution. The addition of 10 p.p.m. of the same chemical caused all of the calcium carbonate to be retained in solution.

Example XXIV

The test was carried out with Brine A in a static system at 160° F. for 20 hours using various concentrations of the scale inhibitors. The control before precipitation contained 1800 mg./l. of calcium carbonate. After the test it contained 420 mg./l. calcium carbonate. The compound of Example III at 2.5 p.p.m. caused the retention of 1020 mg./l. of calcium carbonate, at 5.0 p.p.m. 1280 mg./l. of calcium carbonate, and at 10 p.p.m. 1520 mg./l. of calcium carbonate.

Example XXV

The test was carried out in the same manner as in Example XXIV except that the brine was seeded with 150 mg./l. of calcium carbonate. The amount of calcium carbonate retained in solution before precipitation was 1760 mg./l. At the end of the test it contained 460 mg./l. The compositions of Examples III and V were both tested at concentrations of 1 p.p.m., 2.5 p.p.m., 5 p.p.m. and 10 p.p.m. and were found to be effective in at least partially inhibiting calcium carbonate precipitation except at 1 p.p.m.

Example XXVI

The test was carried out using Brine A at 200° F. for 20 hours in a static system. The brine was seeded with 75 mg./l. of calcium carbonate.

The control before precipitation retained 1760 mg./l. of calcium carbonate. After precipitation it retained 250 mg./l. of calcium carbonate. The compositions of Examples III and V were both effective in causing a greater amount of calcium carbonate to be retained in solution at concentrations of 10 p.p.m., 20 p.p.m. and 30 p.p.m. At 30 p.p.m., the composition of Example III caused all of the calcium carbonate to be retained in solution. At the same concentration, the compositions of Example V caused 1500 mg./l. of calcium carbonate to be retained in solution. Comparative tests of commercial scale inhibitors at the same concentration showed that they were less effective.

The test was carried out using Brine A at 160° F. for 20 hours in an unseeded static system. The control before precipitation retained 1600 mg./l. of calcium carbonate. After the test it retained 480 mg./l. of calcium carbonate.

With the addition of 5 p.p.m. and 10 p.p.m. to separate samples of brine, the compound of Example III caused the retention of 1300 and 1540 mg./l. of calcium carbonate, respectively. The composition of Example VI caused the retention of 600 mg./l. of calcium carbonate at a dosage of 5 p.p.m. and 1320 mg./l. of calcium carbonate at a dosage of 10 p.p.m. The composition of Example VII caused the retention of 1000 mg./l. of calcium carbonate at a dosage of 5 p.p.m. and 1480 mg./l. of calcium carbonate at a dosage of 10 p.p.m. The composition of Example IX caused the retention of 920 mg./l. of calcium carbonate at a dosage of 5 p.p.m. and 1440 mg./l. at a dosage of 10 p.p.m. The composition of Example X caused the retention of 1340 mg./l. of calcium carbonate at a dosage of 5 p.p.m., and 1600 mg./l. of calcium carbonate at a dosage of 10 p.p.m. Thus, this composition was completely effective at 10 p.p.m. A commercial chemical caused the retention of 580 mg./l. of calcium carbonate at a dosage of 5 p.p.m. and 1300 mg./l. of calcium carbonate at a dosage of 10 p.p.m.

Example XXVIII

The procedure was the same as in Example XXVII except that the brine was seeded with 150 mg./l. of calcium carbonate. The control before precipitation retained 1800 mg./l. of calcium carbonate. After precipitation it retained 480 mg./l. of calcium carbonate.

The addition of 10 p.p.m. of the composition of Example III caused the retention of 1780 mg./l. of calcium carbonate. The addition of 10 p.p.m. of the composition of Example V caused the retention of 1560 mg./l. of calcium carbonate. The addition of 10 p.p.m. of the composition of Example IX caused the retention of 1520 mg./l. of calcium carbonate. The addition of 10 p.p.m. of the composition of Example X caused the retention of 1760 mg./l. of calcium carbonate. A commercial chemical at a concentration of 10 p.p.m. caused the retention of 1480 mg./l. of calcium carbonate.

Example XXIX

The test was carried out as described in Example XXVIII. The control before precipitation retained 1560 mg./l. of calcium carbonate. After the test it retained 340 mg./l. of calcium carbonate. At a dosage of 10 p.p.m. the composition of Example III caused the retention of 1160 mg./l. of calcium carbonate. The composition of Example XI caused the retention of 480 mg./l. of calcium carbonate. The composition of Example XII caused the retention of 1060 mg./l. of calcium carbonate. The composition of Example XIII caused the retention of 940 mg./l. of calcium carbonate. The composition of Example XIV caused the retention of 1280 mg./l. of calcium carbonate. The composition of Example XV caused the retention of 1320 mg./l. of calcium carbonate. The composition of Example XVI caused the retention of 1240 mg./l. of calcium carbonate. The composition of Example XVII caused the retention of 1200 mg./l. of calcium carbonate.

Example XXX

A mixture of 50 ml. of Brine B and 50 ml. of Brine C was used in these tests which were carried out at 160° F. for 20 hours in a static system. A control or blank before precipitation retained 3200 mg./l. of calcium sulfate, calculated as calcium carbonate. After the test it retained 2300 mg./l. The compositions of Examples III and V at a dosage of 1 p.p.m. caused a retention of 3100 and 3000 mg./l., respectively.

Example XXXI

The test was carried out as in Example XXX except that the temperature was 212° F. for 6 hours with agitation. The control before precipitation retained 3100 mg./l. of calcium sulfate, calculated as calcium carbonate. At the end of the test it retained 2100 mg./l. The composition of Example V at a dosage of 50 p.p.m. caused the retention of 2900 mg./l., at a dosage of 100 p.p.m. 3000 mg./l., at a dosage of 200 p.p.m. 3100 mg./l.

Example XXXII

The test was carried out as in Example XXXI except that the temperature was 250° F. and the time 20 hours. The control before precipitation retained 2800 mg./l. of calcium sulfate, calculated as calcium carbonate, and mg./l. of calcium sulfate was retained at the end of the test. The composition of Example V at a dosage of 50 p.p.m. caused the retention of 2600 mg./l. and at a dosage of 100 p.p.m. 2800 mg./l.

Example XXXIII

The test conditions were the same as in Example XXXII. Before precipitation the control retained 2800 mg./l. of calcium sulfate, calculated as calcium carbonate. At the end of the test it retained 1500 mg./l. of calcium sulfate. The composition of Example V at a dosage of 10 p.p.m. caused the retention of 2800 mg./l. of calcium sulfate. Commercial scale inhibitors at the same dosages were less effective.

Example XXXIV

Test conditions were the same as in Example XXX except that 100 ml. of Brine B and 100 ml. of Brine C were mixed together to form the test solution. The control before precipitation retained 3000 mg./l. of calcium sulfate, calculated as calcium carbonate. At the end of the test, the control retained 2075 mg./l. of calcium sulfate. At a dosage of 0.5 p.p.m. and 1 p.p.m. the compositions of Examples III, XII, XIII, XIV, XV, XVI and XVII all completely inhibited precipitation of the calcium sulfate The composition of Example XI caused 2400 mg./l. of calcium sulfate to be retained at 0.5 p.p.m. and 2900 mg./l. of calcium sulfate to be retained at 1 p.p.m.

As previously indicated, the hydroxy amine used in preparing the phospate ester should preferably contain more than one hydroxyl group. For some unexplained reason, compounds made from amines containing more than one hydroxyl group, and especially those containing at least 3 and up to 6 hydroxyl groups, are more effective and can be used at lower dosages. The hydroxyl group of the amine is preferably separated from a nitrogen atom of the amine by 2 to 6 carbon atoms, e.g., an alkylene group such as ethylene, propylene, butylene, and homologues. The amine is preferably at least partially soluble in water and the end product is preferably soluble in water at the concentrations of use. While the dosage of the phosphate ester will normally be within the range of 0.5 to 100 p.p.m., certain types of uses may require higher dosages even as high as 200 to 500 p.p.m.

While the phosphate esters in the examples have been prepared by using a commercial grade of polyphosphoric acid, also called "115% phosphoric acid," it will be understood that the reaction can also be carried out with phosphorus pentoxide or with a mixture of polyphosphoric acid and phosphorus pentoxide.

The compositions of the invention are especially effective in the inhibition of scaling on metal surfaces by calcium sulfate, barium sulfate, and calcium carbonate. They are useful in industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations aforesaid, i.e., 0.5 to 100 parts per million. Places where scale build up is most likely to become troublesome are those in the liquid handling systems wherein there is a change in fluid pressure, a change in fluid temperature, or a change in fluid flow rate.

The invention has utility in the prevention of similiar scale deposits occurring in closed and once-through cooling systems where hard water is employed.

The compounds may also have utility in boiler feedwaters and in waters charged to certain desalinization equipment where scale deposition is a problem.

The invention may also be used in the prevention of scale deposits in certain effluent and disposal waters, particularly where other materials used in the prevention of such deposits may constitute a pollution problem.

In a number of oil fields in west Texas and other areas, water floods have been established in which waters incompatible with the connate waters were used for injection. This occurs when a good source of compatible water is not available. Most of these floods are using a high sulfate water to flood a formation which has a high calcium content water. As the waters reach the producing well they mix, and a calcium sulfate deposition occurs, either in the formation at the well bore or in the producing producing equipment. This requires the removal of the tubing, rods and pump for cleaning, and a fracturing job if the formation is plugged, which is the case most of the time. By the practice of the present invention the formation of scale in the producing equipment and underground formation can be reduced or prevented.

Similarly, the invention is applicable to the treatment of water supply wells. The phosphate esters can also be added directly to the input well of a waterflood system consisting of one or more input wells and one or more producing wells.

The invention is hereby claimed as follows:

1. A process for preventing scale deposits from the class consisting of barium sulfate, calcium sulfate, calcium carbonate and mixtures thereof on metal surfaces in contact with water containing said scale-forming chemicals which comprises contacting said surfaces with said water while maintaining therein an effective scale inhibiting amount of a phosphate ester of a hydroxy amine in which the hydroxyl groups of the amine are separated from a nitrogen atom of the amine by at least one carbon atom and the phosphate ester groups consist essentially of one or both of a member selected from the group consisting of

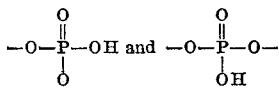

said hydroxy amine being from the class consisting of alkanolamines and oxyalkylated polyethylene-polyamines having 2–5 nitrogen atoms containing not more than 30 moles of alkylene oxide per mole of amine and having a terminal 2-hydroxyethyl group wherein the alkanolamines and oxyalkylated polyethylene-polyamines having 2–5 nitrogen atoms contain 2 to 6 carbon atoms in the alkylene groups.

2. A process as claimed in claim 1 wherein said amine is 0.5 to 100 parts per million parts of said water.

3. A process as claimed in claim 1 in which said ester is at least partially in the form of a salt thereof.

4. A process as claimed in claim 1 wherein said water is a natural hard water or brine.

5. A process as claimed in claim 1 in which said hydroxy amine contains at least three hydroxyl groups which are separated from one or more nitrogen atoms of said amine by alkylene groups containing 2 to 6 carbon atoms.

6. A process as claimed in claim 1 in which said hydroxy amine contains at least two hydroxy ethyl groups.

7. A process as claimed in claim 1 in which said hydroxy amine comprises triethanolamine.

8. A process as claimed in claim 1 in which said hydroxy amine comprises N,N'-tetraethanolethylenediamine.

9. A process as claimed in claim 1 in which said amine comprises both triethanolamine and N,N'-tetraethanolethylenediamine.

10. A process as claimed in claim 1 in which said phosphate ester of a hydroxyamine is added to water used in cooling.

11. A process as claimed in claim 1 in which said phosphate ester of a hydroxyamine is added to boiler feedwater.

12. A process as claimed in claim 1 in which said phosphate ester of a hydroxyamine is added to effluent and disposal waters.

13. A process as claimed in claim 1 in which said phosphate ester of a hydroxyamine is added to water used in water flooding an oil well.

References Cited

UNITED STATES PATENTS

| | | | |
|---|---|---|---|
| 2,562,549 | 7/1951 | Hatch | 252—180 |
| 2,769,737 | 11/1956 | Russell | 148—6.15 |
| 3,151,137 | 9/1964 | Young et al. | 260—9.44 |
| 3,309,352 | 3/1967 | Young et al. | 260—944 |

HERBERT B. GUYNN, Primary Examiner

U.S. Cl. X.R.

21—2.7; 210—58, 180; 252—82

PO-1050
(5/69)

UNITED STATES PATENT OFFICE
CERTIFICATE OF CORRECTION

Patent No. 3,477,956  Dated November 11, 1969

Inventor(s) James R. Stanford and Paul G. Vogelsang, Jr.

It is certified that error appears in the above-identified patent and that said Letters Patent are hereby corrected as shown below:

Column 9, line 14, Claim 1, "
$$\begin{array}{c} O \\ \parallel \\ -O-P-OH \\ | \\ O \end{array}$$
" should read --
$$\begin{array}{c} O \\ \parallel \\ -O-P-OH \\ | \\ OH \end{array}$$
--.

Signed and sealed this 15th day of June 1971.

(SEAL)
Attest:

EDWARD M. FLETCHER, JR.
Attesting Officer

WILLIAM E. SCHUYLER, JR.
Commissioner of Patents